US010375540B2

(12) United States Patent
Blom

(10) Patent No.: US 10,375,540 B2
(45) Date of Patent: Aug. 6, 2019

(54) METHOD AND APPARATUS FOR PROVIDING DATA SHARING SCHEMES TO PROVISION DEVICE SERVICES

(71) Applicant: Nokia Technologies Oy, Espoo (FI)

(72) Inventor: Jan Otto Blom, Lutry (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/412,907

(22) Filed: Jan. 23, 2017

(65) Prior Publication Data
US 2017/0134938 A1    May 11, 2017

Related U.S. Application Data

(63) Continuation of application No. 13/278,978, filed on Oct. 21, 2011, now abandoned.

(51) Int. Cl.
  *H04W 4/21*   (2018.01)
  *H04W 12/02*  (2009.01)
  *H04L 29/06*  (2006.01)
  *H04W 4/02*   (2018.01)

(52) U.S. Cl.
  CPC .............. *H04W 4/21* (2018.02); *H04L 63/04* (2013.01); *H04W 12/02* (2013.01); *H04W 4/02* (2013.01)

(58) Field of Classification Search
  None
  See application file for complete search history.

(56) References Cited

U.S. PATENT DOCUMENTS

| 2002/0188589 | A1  | 12/2002 | Salmenkaita et al. |
| 2006/0106806 | A1  | 5/2006  | Sperling et al. |
| 2010/0024045 | A1  | 1/2010  | Sastry et al. |
| 2010/0076777 | A1* | 3/2010  | Paretti ............... G06Q 30/02 705/1.1 |

(Continued)

FOREIGN PATENT DOCUMENTS

EP    2280362 A1    2/2011

OTHER PUBLICATIONS

Notification of Transmittal of the International Search Report and the Written Opinion of the International Searching Authority, or the Declaration; International Search Report and Written Opinion for International Application No. PCT/FI2012/050919, dated May 15, 2013, 14 pages.

*Primary Examiner* — Henry Tsang
(74) *Attorney, Agent, or Firm* — Ditthavong & Steiner, P.C.

(57) ABSTRACT

An approach is presented for providing data sharing schemes to provision device services. A user determines a data sharing scheme for activation at one or more devices. As a result, the context hub contained within the device processes and/or facilitates a processing of the data sharing scheme to determine applications, services, or a combination that are at least substantially compliant with the selected data sharing scheme. The context hub then causes, at least in part, a presentation to the user of the applications, the services, or a combination. Thereafter, the context hub determines one or more contexts associated with the one or more devices and processes and/or facilitates a processing of the contexts to cause, at least in part, a recommendation of at least another data sharing scheme as well as any relevant and compliant applications, services, or a combination to activate at the one or more devices.

20 Claims, 11 Drawing Sheets

(56) References Cited

U.S. PATENT DOCUMENTS

| | | | |
|---|---|---|---|
| 2010/0107216 A1* | 4/2010 | Tobe | G06F 9/5016 |
| | | | 726/1 |
| 2010/0235877 A1* | 9/2010 | Hu | H04L 63/0227 |
| | | | 726/1 |
| 2011/0030067 A1* | 2/2011 | Wilson | G06F 21/6245 |
| | | | 726/27 |
| 2011/0040736 A1 | 2/2011 | Kalabokis et al. | |
| 2013/0014040 A1 | 1/2013 | Jagannathan et al. | |

* cited by examiner

METHOD AND APPARATUS FOR PROVIDING DATA SHARING SCHEMES TO PROVISION DEVICE SERVICES

RELATED APPLICATION

This application is a continuation of U.S. patent application Ser. No. 13/278,978, filed Oct. 21, 2011, and entitled "METHOD AND APPARATUS FOR PROVIDING DATA SHARING SCHEMES TO PROVISION DEVICE SERVICES", the entire disclosure of which is hereby incorporated by reference herein.

BACKGROUND

Service providers and device manufacturers (e.g., wireless, cellular, etc.) are continually challenged to deliver value and convenience to consumers by, for example, providing increasingly popular network applications, services, or a combination thereof that utilize contextual data collected and uploaded by mobile devices. For example, location data can be shared in real-time by mobile device users to receive targeted advertisements and/or to provide their friends with their location information through various social network services. Location is just one modality of context data that can be collected and uploaded to a service provider. In fact, today's mobile devices can be equipped with a range of sensors enabling the capturing of an assortment of information, e.g., audio, visual, temporal, and/or acceleration data, and in the future, the range of sensors will be even wider. However, privacy concerns associated with sharing contextual data or other potentially sensitive data and the disposition to share data with a service provider likely vary between users. Accordingly, service providers and device manufactures face significant technical challenges to allow users to make informed decisions regarding their individual data sharing, while also presenting them with the benefits to be gained from increased data sharing.

SOME EXAMPLE EMBODIMENTS

Therefore, there is a need for an approach for presenting and/or enabling one or more data sharing schemes at a device.

According to one embodiment, a method comprises determining at least one data sharing scheme for activation at one or more devices. The method also comprises processing and/or facilitating a processing of the at least one data sharing scheme to determine one or more applications, one or more services, or a combination that are at least substantially compliant with the at least one data sharing scheme. The method further comprises causing, at least in part, a presentation of the one or more applications, the one or more services, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine at least one data sharing scheme for activation at one or more devices. The apparatus is also caused to process and/or facilitate a processing of the at least one data sharing scheme to determine one or more applications, one or more services, or a combination that are at least substantially compliant with the at least one data sharing scheme. The apparatus further caused to cause, at least in part, a presentation of the one or more applications, the one or more services, or a combination thereof.

According to another embodiment, a computer-readable storage medium carries one or more sequences of one or more instructions which, when executed by one or more processors, cause, at least in part, an apparatus to determine at least one data sharing scheme for activation at one or more devices. The apparatus is also caused to process and/or facilitate a processing of the at least one data sharing scheme to determine one or more applications, one or more services, or a combination that are at least substantially compliant with the at least one data sharing scheme. The apparatus is further caused to cause, at least in part, a presentation of the one or more applications, the one or more services, or a combination thereof.

According to another embodiment, an apparatus comprises means for determining at least one data sharing scheme for activation at one or more devices. The apparatus also comprises means for processing and/or facilitating a processing of the at least one data sharing scheme to determine one or more applications, one or more services, or a combination that are at least substantially compliant with the at least one data sharing scheme. The apparatus further comprises means for causing, at least in part, a presentation of the one or more applications, the one or more services, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing data sharing schemes to provision device services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
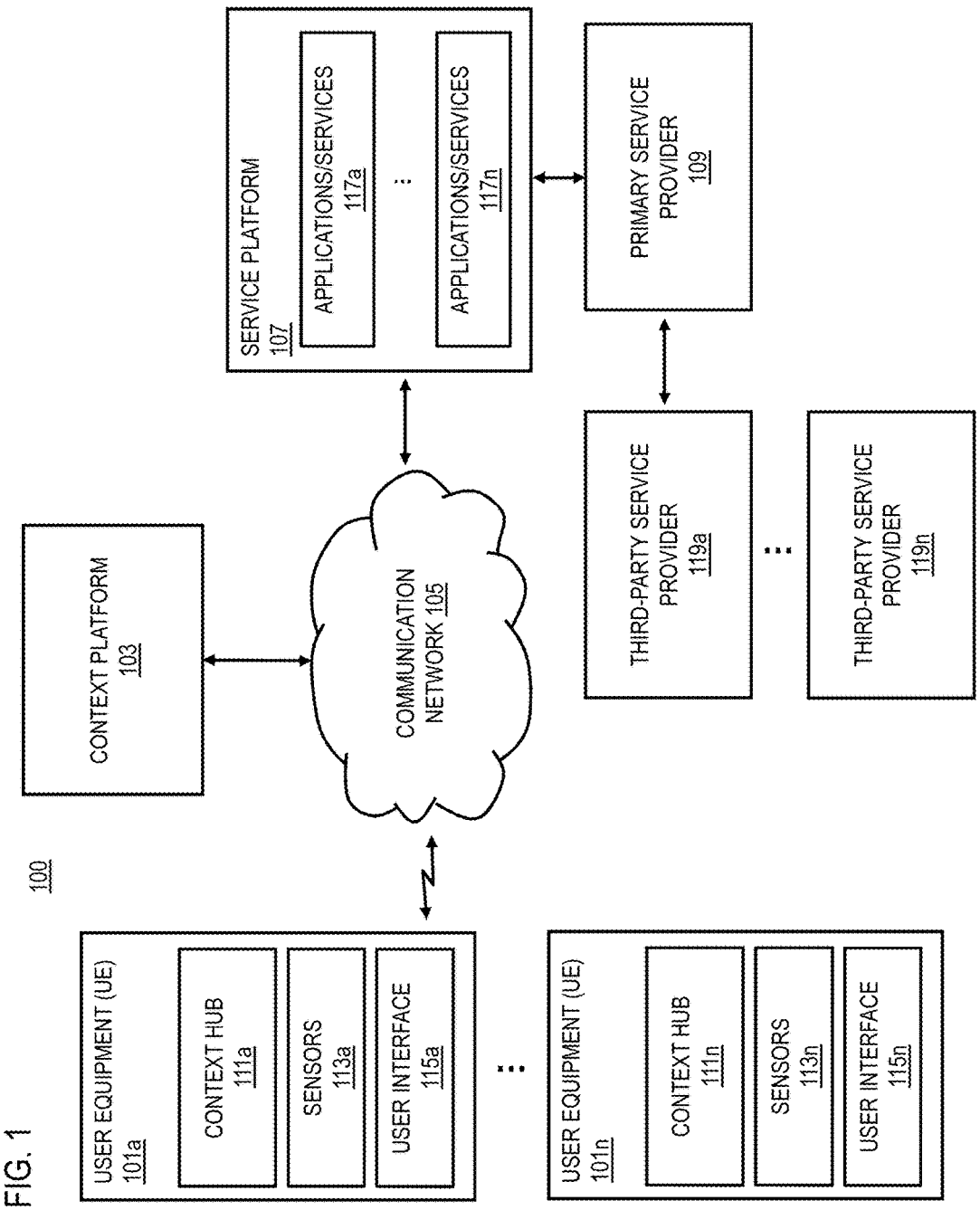
FIG. 1 is a diagram of a system capable of providing data sharing schemes to provision device services, according to one embodiment.

FIG. 1 is a diagram of a system capable of providing data sharing schemes to provision device services, according to one embodiment. As previously discussed, mobile device users are increasingly interested in interacting with various types of data sharing applications, data sharing services, or a combination thereof (e.g., targeted advertising, social networking services, etc.). Many of these applications and services rely, for instance, on potentially personal data collected at user devices. For example, since mobile phones have become ubiquitous, these devices often have been collecting behavioral, real life data in a continuous fashion. The data can therefore be taken as an accurate representation of the behavioral attributes of the user, enabling, e.g., consumer segmentation to be performed based on the data. However, because of the personal nature of the data, users are increasingly wary and often are at odds with the data collection activities of service providers and device manufacturers.

In other words, sharing data (e.g., personal context data) to a service traditionally has generated a trade-off between privacy of the user, on one hand, and a wealth of interesting services available to the user, on the other hand. For example, at the privacy sensitive end of this dimension, data is collected and analyzed locally, on the device itself, without ever sharing the data to the server side for additional processing or to support additional applications. Accordingly, no server-side application or services are available to the user under this scenario. At the open side of the spectrum, the user's data is accessible to a primary service provider (e.g., a trusted manufacturer) and further to third parties through, for instance, Application Programming Interface (APIs) or in a direct way through the primary service provider. The third parties, in turn, can offer a variety of services (e.g., messaging services, social networking services, location-based services, etc.) to the end user in exchange for the data. In some embodiments, other intermediate data sharing schemes are possible (e.g., sharing data with the primary service provider but not third party providers). Accordingly, service providers and device manufactures face significant technical challenges to allow users to make informed decisions regarding their individual data sharing, while also presenting them with the benefits to be gained from increased data sharing.

To address this problem, a system 100 of FIG. 1 allows a user to select a data sharing scheme based on individual data sharing preferences. In one embodiment, the system 100 also provides information to describe the data collection process, information about how the data is used, information regarding the benefits to be gained from a particular data sharing or collection process, and other related information. More specifically, in one embodiment, the system 100 enables the user to select the data sharing scheme (e.g., closed, open, or intermediate) that a user prefers or is most comfortable with. Based on the selected data sharing scheme, the system 100 can determine the applications and/or services that are compliant with the selected data sharing scheme and present them to the user through, for instance, a context hub client installed on a mobile device. In some embodiments, the system 100 may provision some or all of the compliant applications and services for use at the user's device. As previously noted, in one embodiment, the data sharing schemes vary from closed—context data remains on the device and is not accessible to service provides—to intermediate—context data is made available to a primary service provider through Application Programming Interfaces (APIs), but not to third-party service providers, to open—third-party service providers are also allowed access to the user's data. In exchange for sharing certain context data, e.g., location, the user is provided access to one or more applications, one or more services, or a combination thereof.

In one embodiment, the aforementioned data sharing schemes are titled "Keep It," "Share Selectively," and "Open It," respectively, and are based on a user's privacy concerns.

In certain embodiments, data sharing schemes can also be based on security concerns, one or more cost concerns, one or more device capabilities, or a combination thereof. Once a user has activated a particular data sharing scheme, the user is informed of the scheme's defining characteristics, one or more enabled applications, one or more enabled services, or a combination thereof based on the particular data sharing scheme. The system 100 also provides for application/service discovery by, for instance, determining a user's context and recommending a more open data sharing scheme that supports applications appropriate for the user's context.

In one use case, the various embodiments described herein can be used in an environment in which a primary service provider mediates data sharing among users and third party service providers. More particularly, a unified control interface (e.g., a context hub) is set forth, which enables the user to make the choice of whether or not the user is interested in sharing data with the primary service provider and even further to third party service providers. In the latter case, the primary service provider can, for instance, play a role in terms of, e.g., ensuring that the third party services offered to the end user are in line with the selected data sharing schemes, privacy policies, etc. In one embodiment, as a function of the selected data sharing scheme, particular types of applications and/or services are provided to the user through the unified control interface.

In another embodiment, if the user has chosen a data sharing scheme that, for instance, can be upgraded to a more open data sharing scheme (e.g., enable sharing more data or with more providers), the system 100 can determine when the user or the user's device is in a context or situation where it might be appropriate to change the currently active data sharing scheme, and then recommend a new data sharing scheme. By way of example, in a scenario where one of the services enabled by an open data sharing scheme is a contextual bus timetable service (e.g., offered by a third party service provider). However, if the user has selected a closed data sharing scheme, such a service would not be available on the user's device. In this scenario, the system 100 can detect that the user is in a situation or context (e.g., via location sensors to indicate that the user is at a bus stop) and then deliver a recommendation to upgrade the data sharing scheme when the user is at a bus stop where the user is more likely to be in need of a timetable service. In one embodiment, accepting the recommendation to upgrade the data sharing scheme in such a context or situation (e.g., user at a bus stop) can lead to the timetable service becoming available to the user (e.g., via a context hub client).

In addition or alternatively, the user can opt for a preferred data sharing scheme while individual services or applications compliant with different data sharing schemes can be recommended to the user in appropriate instances. This would, for instance, enable a certain general data sharing preference to be followed, while also enabling the user to select individual services from different data sharing schemes when needed.

Although various embodiments discuss data sharing schemes with respect to sharing context data, it is contemplated that the various embodiments described herein are applicable to sharing of any type of data available at the device. In one embodiment, the context data refers, for instance, to data that indicates the state of a device, the state of the device environment and/or the inferred state of a user of the device. The states indicated by the context are, for instance, described according to one or more "contextual parameters" including time, recent applications running on the device, recent World Wide Web pages presented on the device, keywords in current communications (such as emails, SMS messages, IM messages), current and recent locations of the device (e.g., from a global positioning system, GPS, or cell tower identifier), environment temperature, ambient light, movement, transportation activity (e.g., driving a car, riding the metro, riding a bus, walking, cycling, etc.), activity (e.g., eating at a restaurant, drinking at a bar, watching a movie at a cinema, watching a video at home or at a friend's house, exercising at a gymnasium, traveling on a business trip, traveling on vacation, etc.), emotional state (e.g., happy, busy, calm, rushed, etc.), interests (e.g., music type, sport played, sports watched), contacts, or contact groupings (e.g., family, friends, colleagues, etc.), among others, or some combination thereof.

As shown in FIG. 1, the system 100 comprises one or more user equipment (UEs) 101a-101n (also collectively referred to as UEs 101) having connectivity to a context platform 103 via a communication network 105. The UEs 101 also have connectivity to a service platform 107 (e.g., an application store) and a primary service provider 109 via the communication network 105. The UEs 101 may include context hubs 111a-111n (also collectively referred to as context hubs 111), which can communicate with the context platform 103 via the communication network 105 to share context data and can also perform all or a portion of the functions of the context platform 103 with respect to processing context data as discussed with respect to the various data sharing schemes and embodiments described herein. The context platform 103 may exist in whole or in part within the UEs 101, or within the service platform 107, or independently. The UEs 101 may also include sensors 113a-113n (also collectively referred to as sensors 113) to determine context information. By way of example, the sensors 113 may include a location sensor, a speed sensor, an audio sensor, brightness sensor, etc. In certain embodiments, there may be several sensors 113 in the UEs 101 with each sensor 205 concentrating on one or more context data elements. Exemplary modules of the UEs 101 may also include user interface modules 115a-115n (also collectively referred to as user interfaces 115). Based on at least one data sharing scheme contained within the context platform 103, the system 100 may grant access or otherwise provision one or more compliant applications, one or more compliant services, or a combination thereof 117a-117n (also collectively referred to as applications/services 117) via, for instance, the service platform 107. Depending on the one or more selected data sharing schemes, the primary service provider 109 and/or third-party service providers 119a-119n (also collectively referred to as third-party service providers 119) can obtain access to a user's context data from the context platform 103 and/or provide a user access to one or more applications/services 117 via the service platform 107 and communication network 105.

In one embodiment, a closed data sharing scheme contained within the context hub 111, when selected by a user, causes the UEs 101 to run one or more applications, one or more services, or a combination thereof locally and prevents the UEs 101 from sharing context data via the communication network 105 to external applications/services 117. An example of such an application, service or combination thereof could include, e.g., "Location Based Messaging" whereby a message is automatically sent to a desired person upon arriving at a certain location. Another more open data sharing scheme contained within the context hub 111, when selected by a user, causes the sharing of context data (e.g., location) via the communication network 105 with a primary service provider 109 via the service platform 107. This context data is not shared, however, with third-party service providers 119. In exchange, the user gains access to applications/services 117 (e.g., bus timetable services) based on the user's shared context data and individual data sharing scheme. In addition, the user gains access to recommendations regarding more open data sharing schemes and additional applications/services 117 based on the user's shared context data and individual data sharing scheme. Yet another data sharing scheme contained within the context hub 111, when selected by a user, causes the sharing of context data via the communication network 105 with both a primary service provider 109 and third-party service providers 119 via the service platform 107. In exchange, the user gains access to all relevant applications/services 115 accessed through the service platform 107. It is contemplated that the context hub 111 may make available any number of data sharing schemes (e.g., to reflect different privacy policies or preferences of the user) for selection and enforcement.

In one embodiment, the system 100 allows a user to activate another data sharing scheme contained in the context hub 111 and/or one or more applications/services 117 through the UEs 101 for a duration that is permanent, for a predetermined period, for the one or more contexts, for at least one of the one or more other applications, for at least one of the one or more other services, or a combination thereof so as to allow the user to manage data sharing preferences in a way that best suits the user's specific needs. For example, as described previously, the system 100 may generate recommendations to the user to activate a different data sharing scheme in order to use a particular application that is appropriate to a user's context or situation (e.g., standing at a bus stop). In one embodiment, the data sharing scheme can be activated for the duration of the context (e.g., while standing at the bus stop) and then returned to a preferred or previously selected data sharing scheme when the context or situation no longer exists (e.g., the user is no longer at the bus stop).

In one embodiment, the system 100 causes the generation of notifications that alert a user of, for instance, (1) a recommendation or availability of a more open data sharing scheme based on a user's context or situation; (2) one or more applications/services that are applicable to a determined user context or situation or that comply with the recommended data sharing scheme; and the like. In addition, the system 100 can also generate notifications related to the functioning or enforcement of the data sharing schemes such as generating notifications when an application attempts to perform an operation (e.g., transmitting data to a backend server) that would violate a particular data sharing scheme.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the context platform 103, the context hub 111, and service platform 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
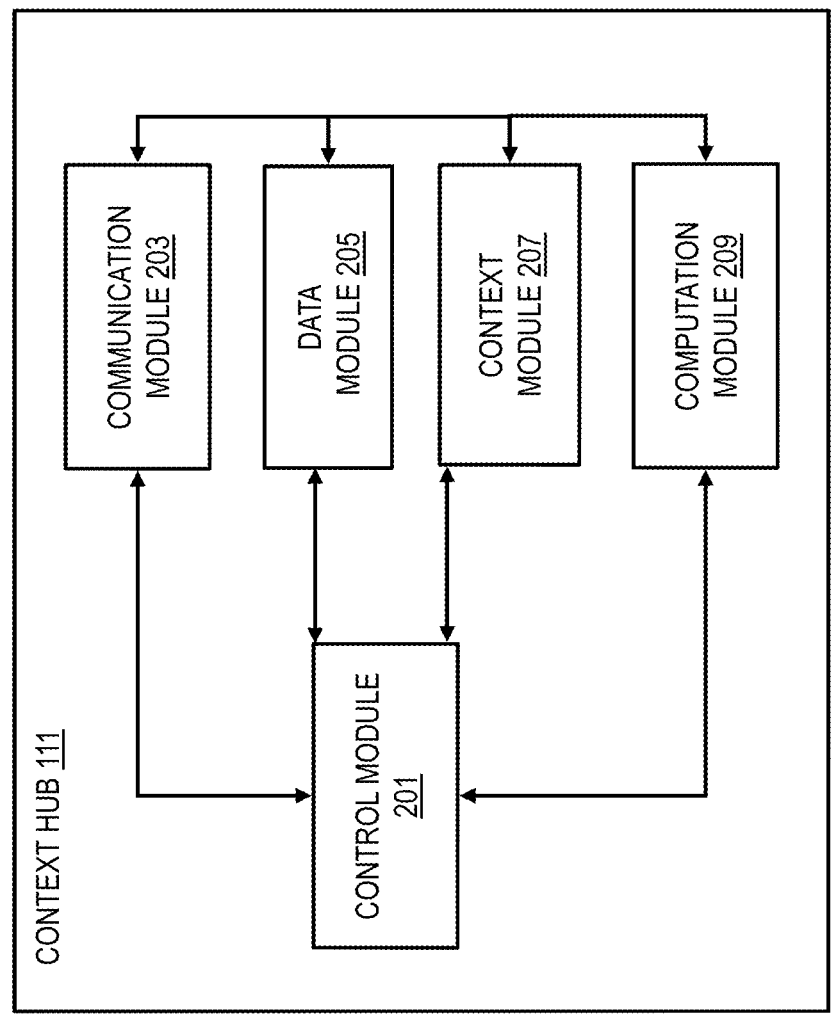
FIG. 2 is a diagram of the components of a context hub, according to one embodiment.

FIG. 2 is a diagram of the components of a context hub 111, according to one embodiment. By way of example, the context hub includes one or more components for providing data sharing schemes to provision device services as described in the various embodiments discussed herein. It is contemplated that the functions of these components may be combined in one or more components or performed by other components of equivalent functionality. As noted previously, it is contemplated that all or a portion of the functions of the context platform 103 may be performed by the context hub 111. In one embodiment the determination of whether to perform a process at the context platform 103 or the context hub 111 depends on the data sharing scheme selected by a user. For example, because the context hub 111 is local to the UEs 101, context data need not be transmitted from the UEs 101 if the context hub 111 performs all or a portion of the one or more applications, one or more services, or a combination thereof. In one embodiment, the data sharing scheme may be based on a user's privacy concerns and in some cases, be balanced against the greater resources (e.g., computational resources, memory resources, etc.) available at the context platform 103.

In this embodiment, the context hub 111 includes a control module 201, a communication module 203, a data storage module 205, a context module 207, and a computation module 209. The control module 201 oversees tasks, including tasks performed by the communication module 203, the data storage module 205, the context module 207, and the computation module 209. The communication module 203 is used for communication between the context hub 111, the UEs 101, and the service platform 107. The communication module 203 may be used to communicate commands, requests, data, etc. For example, the communication module 203 may also be used to cause preloading of a device (e.g., UE 101) with applications, services, or a combination thereof local to the UEs 101 (i.e., do not require a network connection to function). The data module 205, for instance, manages (e.g., organizes) the collected data based on the general characteristics, rules, logic, algorithms, instructions, etc. associated with each data sharing scheme and contained within the data module 205. The data module 205 may also communicate with the communication module 203 to receive and manage the collection of applications/services 117, updated general characteristics, rules, logic, algorithms, instructions, etc. obtained through the service platform 107. The data module 205 may also communicate with the context module 207 to receive and manage the collection of context data obtained through the sensors 113.

In one embodiment, the context module 207 may determine the context or situation of the UEs 101 (e.g., proximity to a bus stop or a bank or more specifically proximity to a particular bus stop or a particular bank) using the sensors 113 and the data module 205. The communication module 203 may also cause the presentation to a user of applications/services 117 and context data obtained by the context module 207. For example, if the user is willing to share this particular context data, the application/service 117 may be acquired from the service platform 107. The computation module 209 handles various analysis, comparisons, computations etc. based on the general characteristics, rules, logic, algorithms, instructions, etc. contained within the data module 205. The computation module may process the collection of data from the context module 207 and/or metadata associated with one or more applications, one or more services, or a combination thereof to determine whether the one or more applications, one or more services, or a combination thereof is compliant with a data sharing scheme and/or relevant to one or more contexts or situations associated with the UEs 101.

In one embodiment, the communication module 203 may communicate with the data module 205 to enable a user to select a preloaded data sharing scheme (e.g., "Keep It,"

"Share Selectively," or "Open It") upon activation of the UE 101s. In one embodiment, the data sharing schemes are based, at least in part, on privacy policies, on security policies, on cost policies, on device capabilities, or a combination of policies, which are defined within the data module 205.

In one embodiment, the computation module 209 can further process contexts or situations determined by the context module 207 and metadata associated with the applications/services 117 to recommend another data sharing scheme and/or determine a preferred application/service 117. For example, an application/service 117 (e.g., a particular bus timetable) may be preferred according to embedded metadata associated with high customer satisfaction ratings. The communication module 203 may then cause a presentation to a user of the another data sharing scheme and/or the preferred application/service 117.

In one embodiment, the control module 201 causes an activation of another data sharing scheme permanently, for a predetermined period, for a duration of the one or more contexts, for at least the duration of one or more applications/services 117 based on the context data determined by the context module 207 and/or rules, logic, algorithms, instructions, etc. found within the data storage module 205. In one embodiment, the computation module 213 determines which applications/services 117 will be gained or lost as a result of a change in the data share scheme and then causes a presentation to a user of the results of this analysis through the communication module 203.

In one embodiment, when a user selects the "Keep It" data sharing scheme, the control module 201 prevents the communication module 203 from sharing data contained within the data module 205 with a primary service provider 109 and/or a third-party service provider 119. As a result, the user is limited to using applications, services, or a combination thereof that do not require a network connection to function. In contrast, when a user selects the "Share Selectively" data sharing scheme, the control module 201 causes the communication module 203 to allow a primary service provider 109 access to the data storage module 203, particularly to any context data determined by the context module 207. As a result, the control module 201 also causes the computation module 209 to determine the availability of applications/services 117 at the service platform 107 (e.g., application store) that are compliant with the data sharing scheme's rules, logic, algorithms, instructions, etc. found within the data storage module 205. The control module 201 then causes a presentation to the user through the communication module 203 of the potential applications/services 117. In one example, the control module 201 can further cause the communication module 203 to populate the data module 205 with the applications/services 117 selected by the user and the communication module 203 may present the user with a confirmation of the selection.

In one embodiment, when a user selects the "Open It" data sharing scheme, the control module 201 causes the communication module 203 to allow both a primary service provider 109 and/or a third-party service provider 119 access to the data module 205, particularly to any context data determined by the context module 207. Again, the control module 201 causes the computation module 209 to determine the availability of compliant applications/services 117 at the service platform 107, causes a presentation of the possibilities to the user through the communication module 203, and can cause the communication module 203 to populate the data module 205 with the applications/services 117 selected by the user. In some instances, a user's selection of the "Open It" data sharing scheme may provide the user with access to more and/or alternative applications/services 117 than if the user selected the "Share Selectively" data sharing scheme.

Figure 3A:
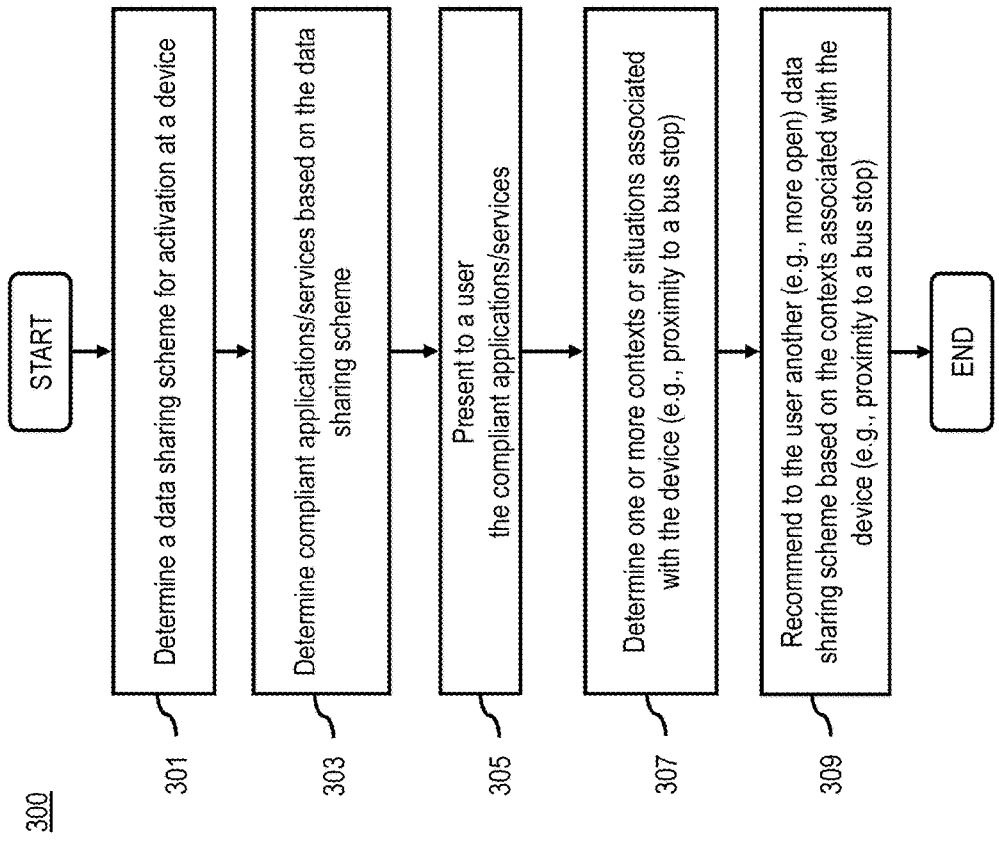
FIGS. 3A-3C are flowcharts of processes for providing data sharing schemes to provision device services, according to various embodiments.
Figure 3B:
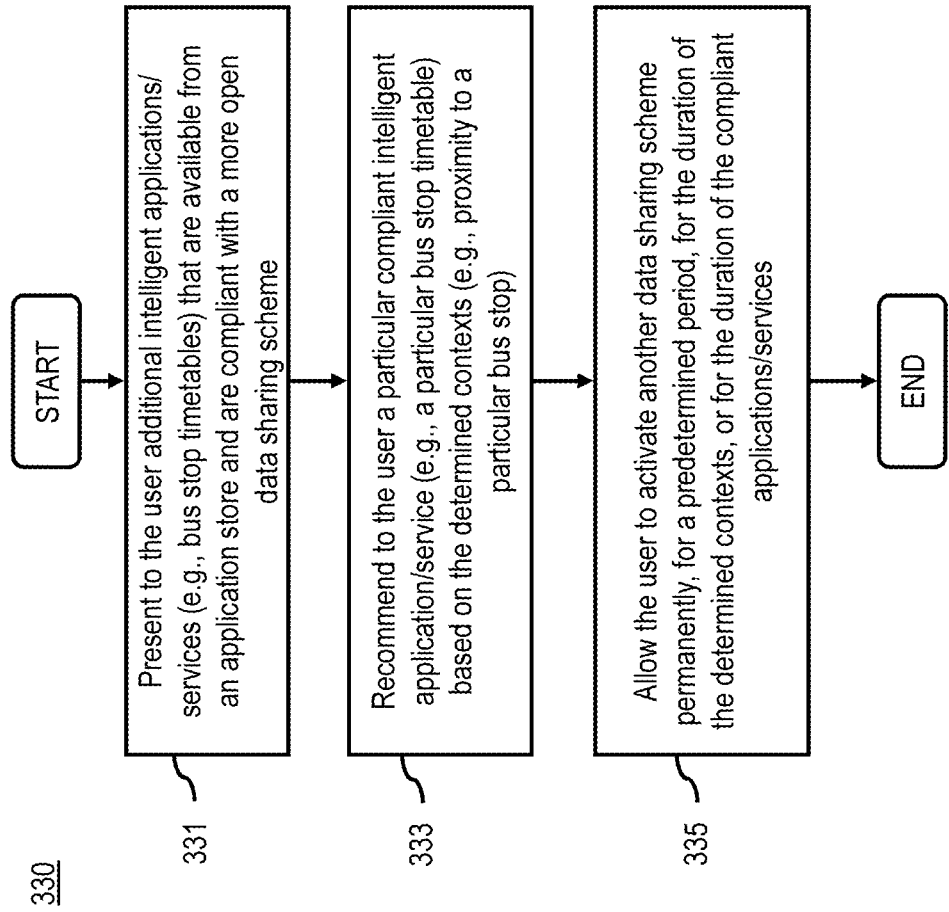
Figure 3C:
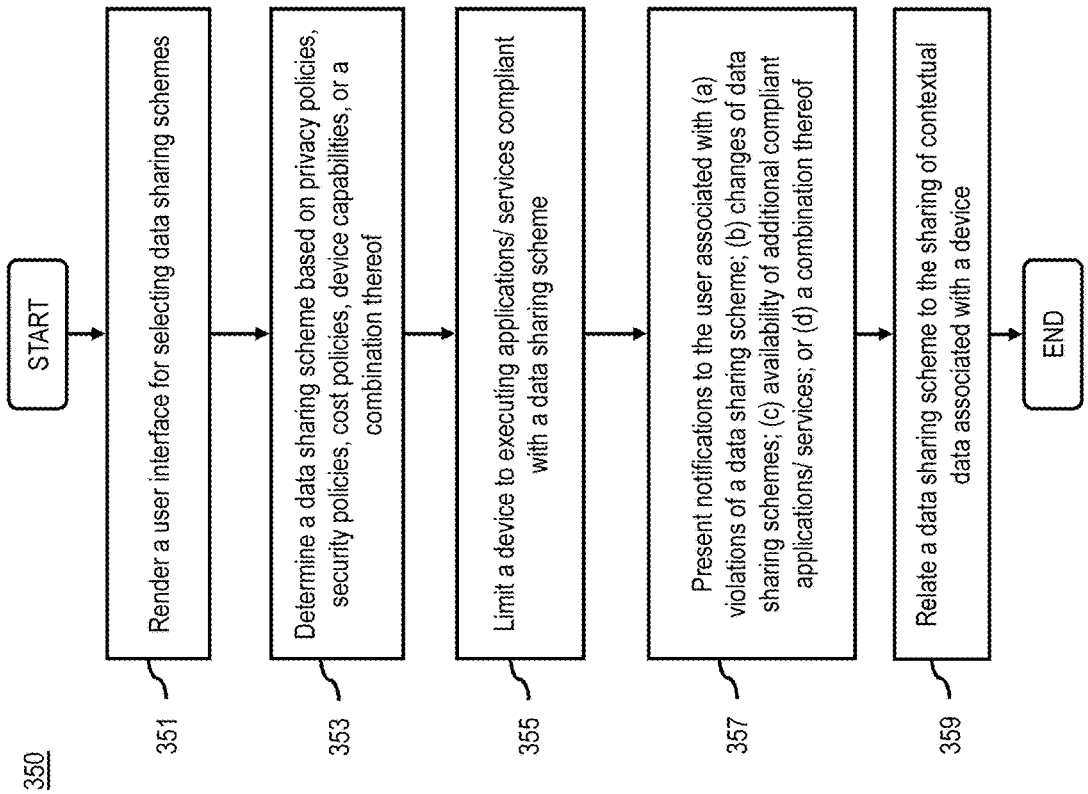
Figure 6:
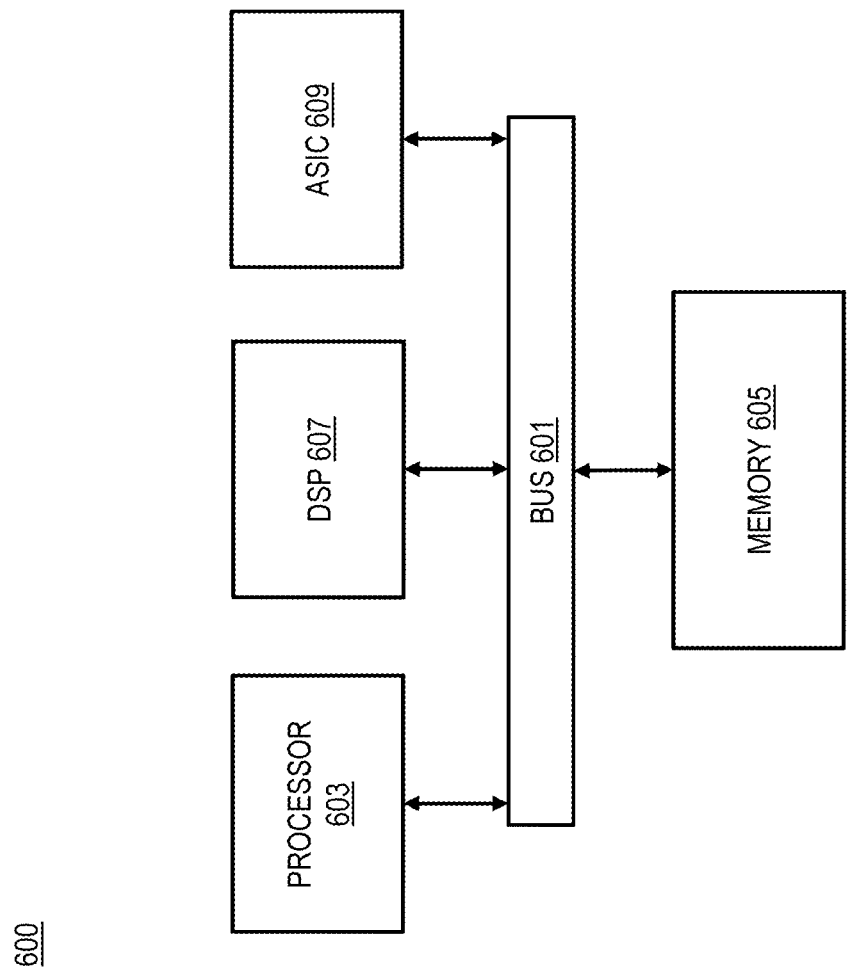
FIG. 6 is a diagram of a chip set that can be used to implement an embodiment of the invention.

FIGS. 3A-3C are flowcharts of processes for providing data sharing schemes to provision device services, according to various embodiments. FIG. 3A depicts a process 300 for generating a recommendation of at least another (e.g., more open) data sharing scheme to activate on one or more devices (e.g., UEs 101) based upon one or more contexts (e.g., proximity to a bus stop) associated with the one or more devices (e.g., the UEs 101). In one embodiment, the context hub 111 performs the process 300 and is implemented in, for instance, a chip set including a processor and a memory as shown in FIG. 6.

In step 301, the context hub 111 processes at least one data sharing scheme for activation at one or more UEs 101. As discussed previously, the UEs 101 can be configured to include multiple data sharing schemes for selection by a user. By way of example, a data sharing scheme can define rules, policies, criteria, etc. for specifying what data or data elements can be shared by the UEs 101 with external applications or services. The data may include, for instance, potentially sensitive information such as contextual data (e.g., a user's location, behavioral patterns, preferences, etc.) that the user may want to protect from disclosure. In one example use case, data sharing schemes can include "Keep It," "Share Selectively," and "Open It." In this example, "Keep It" specifies policies where the UEs 101 do not permit specified data to be transmitted or shared beyond the device (e.g., not transmitted to applications or services external to the UEs 101). The "Share Selectively" data sharing scheme provides a more liberal or open policy where the UEs 101 are permitted to share data with certain designated or trusted applications or services. Finally, the "Open It" data sharing scheme provides for sharing of data with any applications or services requesting such data.

In step 303, the context hub 111 processes the at least one data sharing scheme to determine one or more applications, one or more services, or a combination thereof that are at least substantially compliant with the at least one data sharing scheme. For example, it is often the case that a more open data sharing scheme enables the UEs 101 to have a greater selection of applications or services that depend on data generated or shared from the UE 101 (e.g., online social networking services may become available if the UE 101 is allowed to share status or presence information). In one embodiment, the context hub 111 determines the available compliant applications or service based on the general characteristics, rules, logic, algorithms, instructions, etc. specified for the selected data sharing scheme. For example, when a user selects the "Keep It" data sharing scheme, the context hub 111 determines the one or more compliant applications, the one or more compliant services, or a combination thereof from the applications/services contained within the data module 205 that do not require a network connection to function and/or that do not transmit data outside of the UE 101. In contrast, when a user selects the "Share Selectively" or "Open It" data sharing schemes, for example, the context hub 111 determines the one or more applications, the one or more services, or a combination thereof (e.g., applications/services 117) based on one or more selection criteria (e.g., such as whether the application or service is provided by a primary service provider 109 versus a third-party service provider 119).

In step 305, the context hub 111 causes a presentation (e.g., graphical display) to the user of the applications/services that are available based on the user's selection of a data sharing scheme. As discussed previously, the graphical display may also provide explanatory text or other information to describe the currently active data scheme (e.g., what data or data elements can be shared under the scheme, one or more privacy policies associated with the scheme, etc.), applications or services that comply with the data scheme, and/or other related information.

In step 307, the context hub 111 processes context data (e.g., location information, time information, activity information, etc.) associated with the UE 101, which can be determined by the context module 207 and sensors 113. As previously stated, the context data refers, for instance, to data that indicates the state of a device, the state of the device environment and/or the inferred state of a user of the device. Moreover, as also previously stated the sensors 113 may include a location sensor, a speed sensor, an audio sensor, brightness sensor, etc. In step 309, the context hub 111 processes the context data (e.g., the device's proximity to a bus stop) to recommend to the user another (e.g., more open) data sharing scheme (e.g., "Share Selectively" or "Open It") based on the availability of applications/services 117 that are compliant with a more open data sharing scheme and are appropriate to a situation indicated by the context data (e.g., when the context data indicates that the user is near a bus stop). In one embodiment, the context hub 111 may also generate a recommendation that the user consider a more closed data sharing scheme, for example, where the context hub 111 determines through comparison of the context data determined by the context module 207 and information already contained within the data module 205 that the user is situated in a new environment or an environment where privacy or data security may be of concern (e.g., in a public space).

FIG. 3B shows a process 330 for generating a recommendation to activate at least another data sharing scheme on one or more devices based on one or more contexts associated with the one or more devices (e.g., proximity to a bus stop). In one embodiment, the context hub 111 performs the process 330 and is implemented in, for instance, a chip set including a processor and a memory as shown in FIG. 6. In step 331, the context hub 111 causes a presentation to the user through the communication module 203 of one or more applications/services 117 that are available from the service platform 107 (e.g., an application store) based on a comparison of the metadata associated with the applications/services 117 and the general characteristics, rules, logic, algorithms, instructions, etc. associated with another available data sharing scheme (e.g., "Share Selectively" or "Open It"). In step 333, as previously stated, in addition to causing a presentation of the one or more applications/services 117 to the user, the context hub 111 can also cause a presentation to the user of recommended and/or preferred applications/services 117 (e.g., a particular bus timetable) based on a determined context (e.g., proximity to a bus stop). In step 335, the context hub 111 causes an activation of the another (e.g., more open) data sharing scheme (e.g., "Share Selectively" or "Open It") permanently, for a predetermined period, for a duration of the one or more contexts (e.g., proximity to a bus stop), for at least the duration of the applications/services 117, or a combination thereof. In an exemplary embodiment, a user is able, at any time, to access full information about which data sharing scheme is activated at the UEs 101. In one embodiment, the specific duration for which the context hub 111 activates another data sharing scheme is determined by a user's preferences. For example, the user may enjoy having access to all of the available applications/services 117 and, therefore, wish to activate the "Open It" data sharing scheme permanently.

FIG. 3C shows a process 350 for generating at least one or more additional embodiments of the process 300 for generating a recommendation of at least another data sharing scheme to activate on one or more devices based upon one or more contexts associated with the one or more devices. In one embodiment, the context hub 111 performs the process 350 and is implemented in, for instance, a chip set including a processor and a memory as shown in FIG. 6. In step 351, the context hub 111 causes a rendering of a user interface for selecting at least one data sharing scheme on an initiation of, a change in, or combination thereof at a UE 101. As discussed previously, the graphical display may include both the data sharing schemes (e.g., "Keep It," "Share Selectively," or "Open It") and explanatory text regarding each data sharing scheme. In step 353, the context hub 111 processes the at least one data sharing scheme based, at least in part, on one or more privacy policies, one or more security policies, one or more cost policies, one or more device capabilities, or a combination thereof contained within the data module 205. For example, in certain regions of the world the cost of data transmission is relatively expensive therefore the data sharing schemes may be primarily based on cost policies whereas in regions of the world where data transmission costs are relatively inexpensive, the data sharing schemes may be primarily based on privacy policies.

In step 355, the context hub 111 causes a limitation of the UEs 101 to executing applications or services that are at least substantially compliant with the data sharing scheme selected by the user based on the general characteristics, rules, logic, algorithms, instructions, etc. associated with each data sharing scheme. For example, if a user selects the "Keep It" data sharing scheme, the user is unable to then select applications/services 117 that are associated with another (e.g., more open) data sharing scheme (i.e., require data sharing to function). In step 357, the context hub 111 cause a presentation to a user of one or more notifications associated with (a) one or more violations of the at least data sharing scheme (e.g., when a user attempts to activate a bus stop timetable application while in the "Keep It" data sharing scheme is activated); (b) one or more requests to alter the data sharing scheme (e.g., a recommendation is generated to cause a user to select another (e.g., more open) data sharing scheme and/or applications/services 117 associated with another (e.g., more open) data sharing scheme); (c) an availability of additional applications/services 117 that are at least substantially compliant with another data sharing scheme; or (d) a combination thereof. In one embodiment, the notifications associated with the above events could include text, light emitting diodes (LEDs), physical notifications (e.g., vibrations), auditory tones, etc., or a combination thereof. In step 359, the context hub 111 processes at least one data sharing scheme, which relates, at least in part, to sharing of contextual data. For example, one data sharing scheme may cause the UEs 101 to share accelerometer information (e.g., how fast or slow the UEs 101 are moving) where another (e.g., more open) data sharing scheme may cause the UEs 101 to share location information (e.g., GPS coordinates) associated with the UEs 101.

Figure 4A:
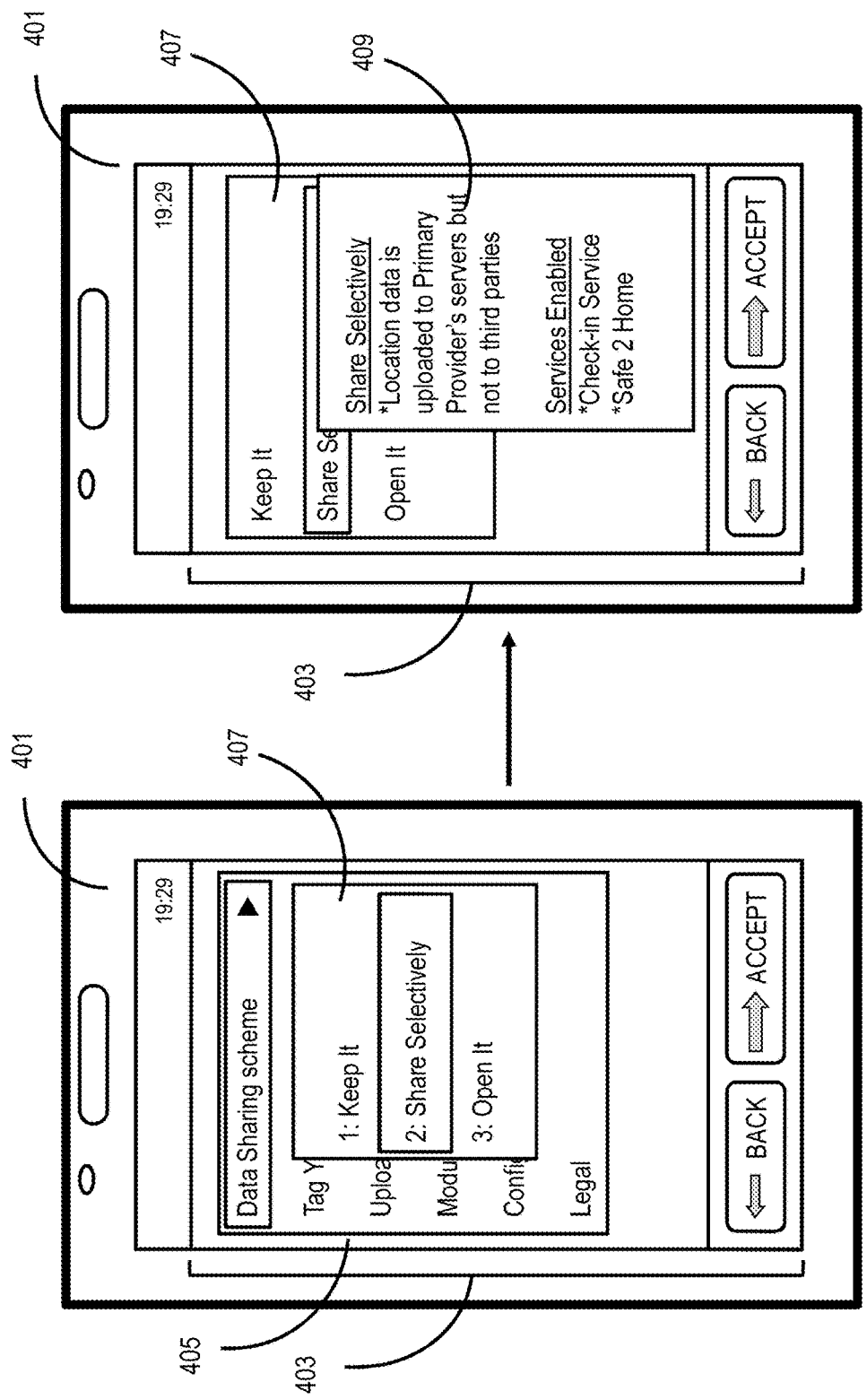
FIGS. 4A-4C are diagrams of a user interface utilized in the processes of FIGS. 3A-3C, according to various embodiments.
Figure 4B:
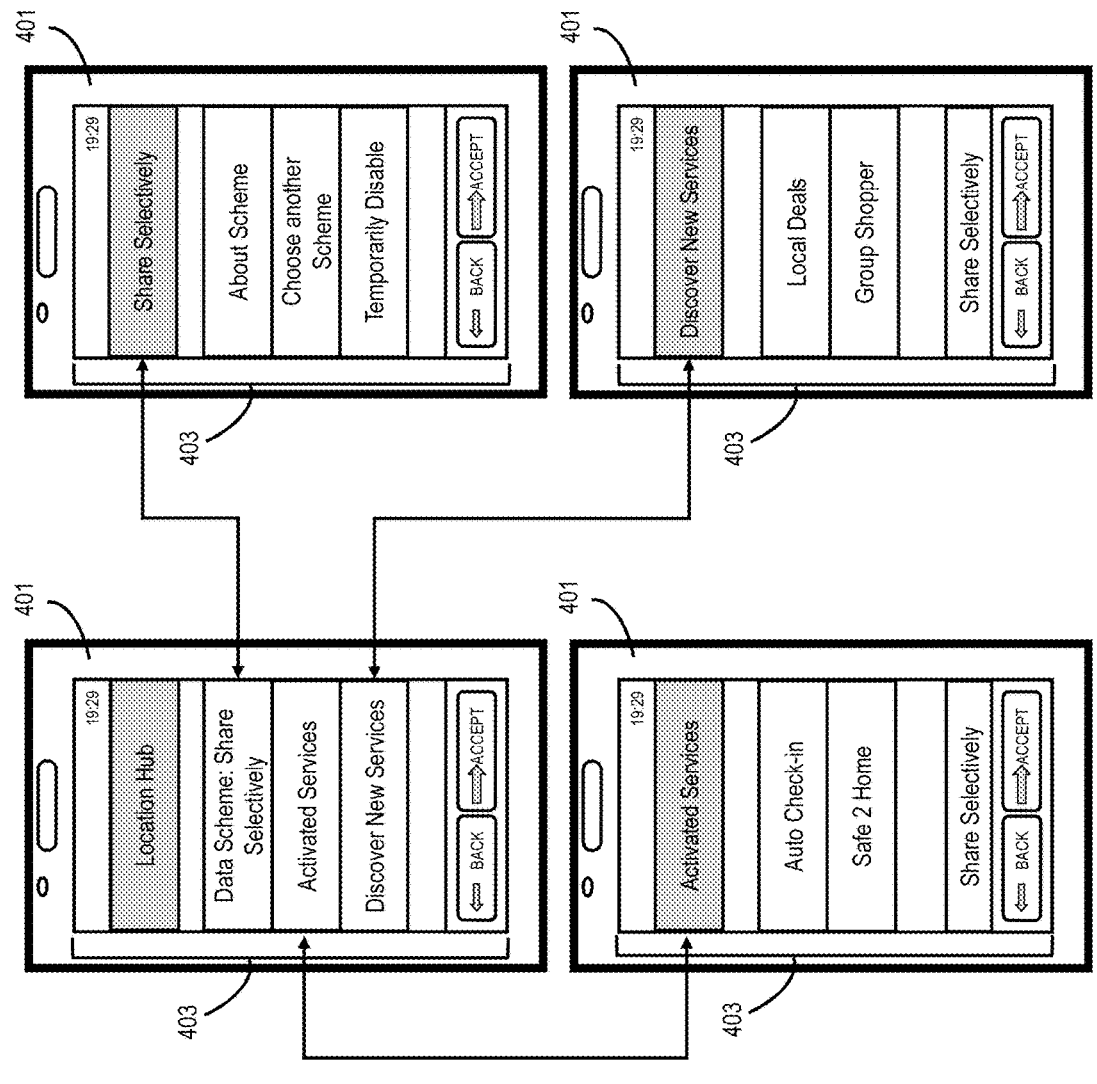
Figure 4C:
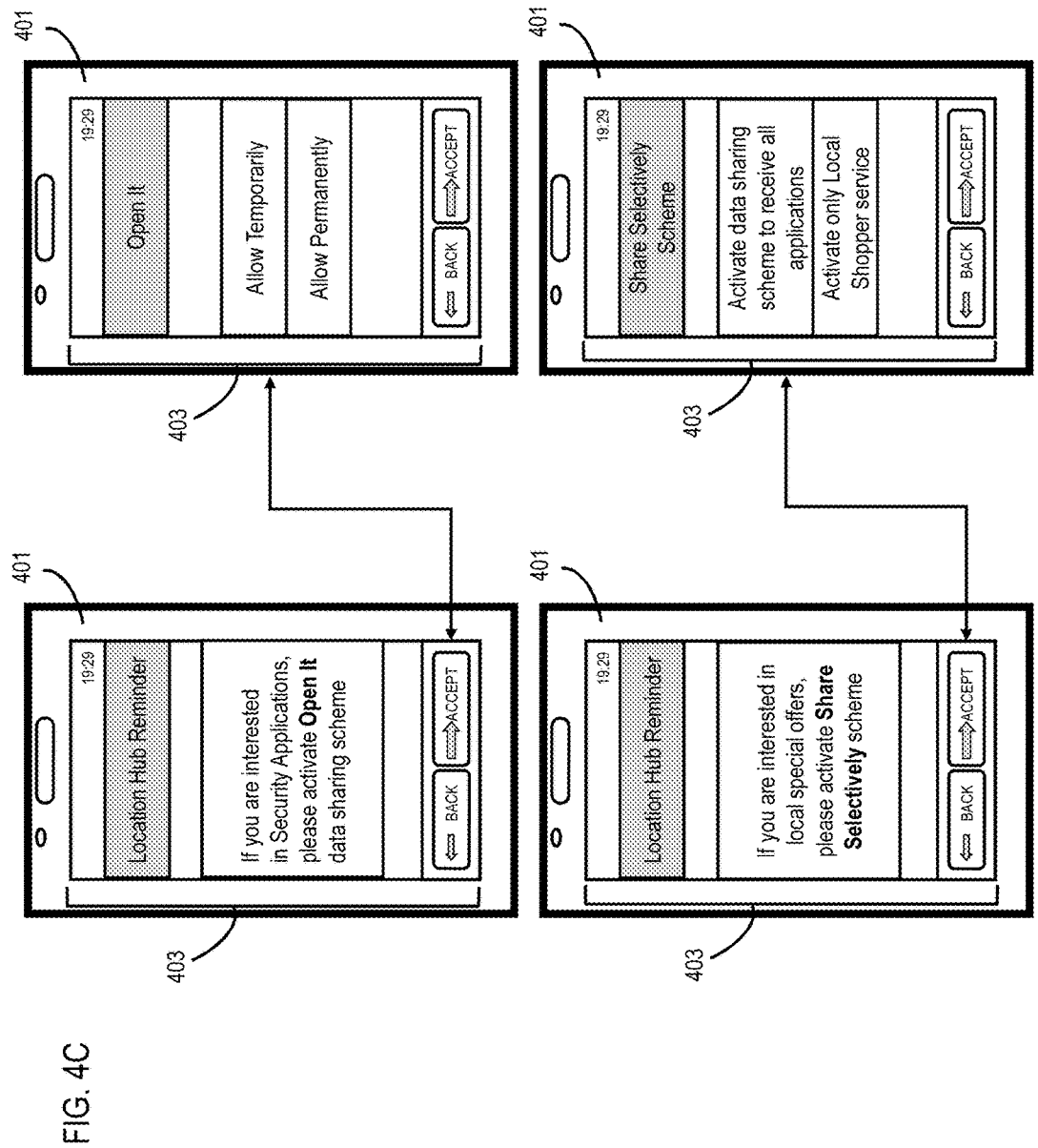

FIGS. 4A-4C are diagrams of an embodiment implemented by a mobile device client titled "Location Hub." In one embodiment, the "Location Hub" client functions the same as the context hub 111. FIG. 4A depicts an example of a mobile device 401 and a user interface 403, which is identical to the user interfaces 115. When a user selects a feature of the menu 405 (e.g., data sharing scheme), an enablement window 407 appears over the menu 405 to inform the user of the various subcategories of that particular feature. For example, when a user selects the feature of menu 405 "data sharing schemes," the subcategories "Keep It," "Share Selectively," and "Open It" appear in the enablement window 407. In one embodiment, while a data sharing scheme is highlighted by a user in the enablement window 407, an additional enablement window 409 appears to inform the user of the general characteristics of the particular data sharing scheme as well as any relevant and/or compliant applications or services. In one embodiment, the menu 405 is no longer visible while a user selects a data sharing scheme in enablement window 407 in order to minimize the amount of information presented to the user at any given time.

FIG. 4B is a diagram of an example main page of the "Location Hub" client. The "Location Hub" main page presents a user with the possibility to obtain more information about the activated data sharing scheme, to access activated services, and to discover additional applications/services 117 associated with the activated data sharing scheme. In one example, when a user selects the "Share Selectively" data sharing scheme, the user is presented with the option to learn more about the scheme, choose another data sharing scheme, or temporarily disable the particular feature. In one embodiment, if the user temporarily disabled the activated data sharing scheme, the "Location Hub" would prevent the communication module 203 from sharing data contained within the data module 205, but in another example, the "Location Hub" would cause the UEs 101 to revert to the previously selected data sharing scheme for that temporary period of time.

FIG. 4C is a diagram of the recommendation features of the "Location Hub" client wherein various recommendations, options, reminders, prompts, notifications, etc. associated with another (e.g., more open) data sharing scheme are presented to a user. For example, a user may select to activate a more open data sharing scheme (e.g., "Share Selectively" or "Open It") temporarily or permanently depending on the user's preferences and the user may also select to access one or all of the applications, services, or a combination thereof compliant with a particular data sharing scheme. As previously described, a user may choose among the various selections based on personal preference, but other factors, such as data transmission costs and anticipated time spent in a particular location may also play a role in the user's selections.

The processes described herein for providing data sharing schemes to provision device services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
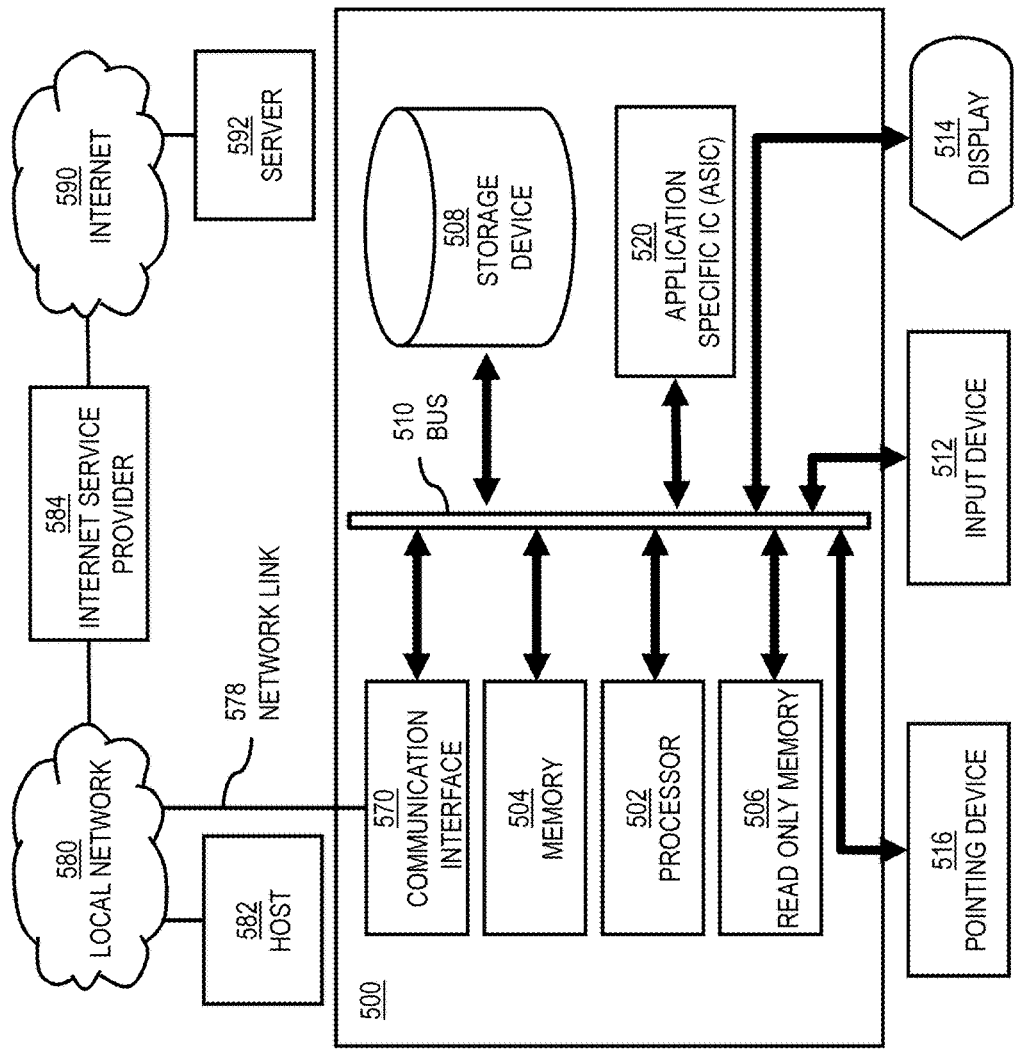
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide data sharing schemes to provision device services as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing data sharing schemes to provision device services.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing data sharing schemes to provision device services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing data sharing schemes to provision device services. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing data sharing schemes to provision device services, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing data sharing schemes to provision device services to the UEs 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide data sharing schemes to provision device services as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing data sharing schemes to provision device services.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide data sharing schemes to provision device services. The memory 605 also stores the data associated with or generated by the execution of the inventive steps.

Figure 7:
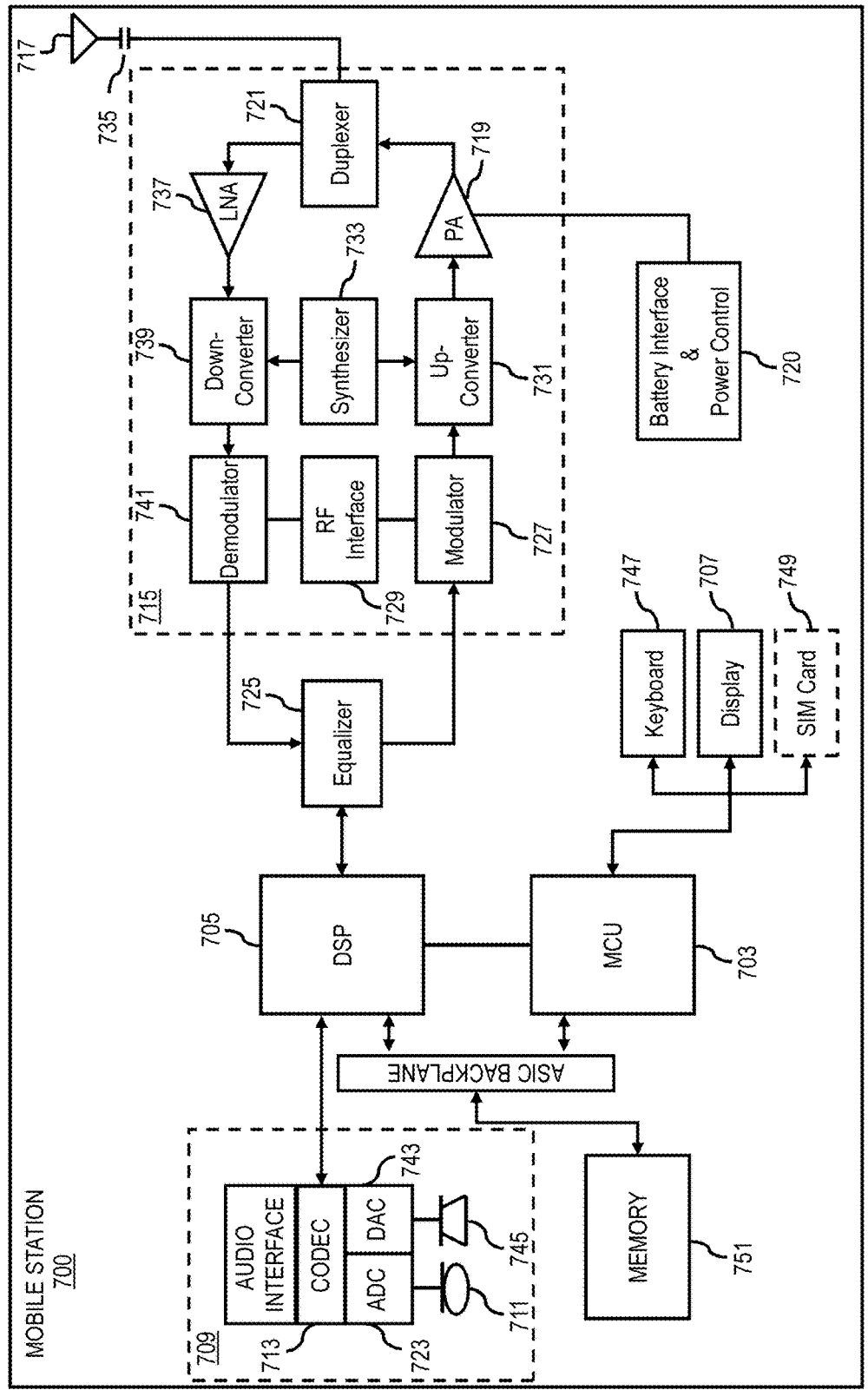
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing data sharing schemes to provision device services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing data sharing schemes to provision device services. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to providing data sharing schemes to provision device services. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A mobile device for providing data sharing schemes, the mobile device comprising:
   at least one processor; and
   at least one memory including computer program code for one or more programs,
   the at least one memory and the computer program code configured to, with the at least one processor, cause the mobile device to perform at least the following,
   determine a data sharing scheme activated at the mobile device, wherein the mobile device includes one or more sensors, a context hub, and at least one user interface, wherein the one or more sensors of the mobile device are configured to gather sensor information relating to context data associated with the mobile device, wherein the data sharing scheme determines whether the context data can be transmitted from the mobile device to one or more devices over a network;
   determine one or more applications, one or more services, or a combination thereof that will transmit the context data in a manner compliant with the determined data sharing scheme;
   provision, based on the activated data sharing scheme, the one or more applications, the one or more services, or a combination thereof for execution at the mobile device;
   determine a new point of interest context of the mobile device utilizing at least the sensor information gathered by the one or more sensors of the mobile device, wherein the new point of interest context is that the mobile device is at or in proximity to a new point of interest;
   determine, utilizing the context hub without user intervention, another data sharing scheme to potentially activate based on the new point of interest context;
   determine, based on the another data sharing scheme, which one or more applications, one or more services, or a combination thereof are to be gained or lost based on the potential activation of the another data sharing scheme;
   cause a presentation of the one or more applications, the one or more services, or a combination thereof to be gained or lost based on the potential activation;
   render the at least one user interface configured to enable selecting, based on the new point of interest context, between the activated data sharing scheme and the another data sharing scheme;
   receive a selection indicating between the activated data sharing scheme and the another data sharing scheme; and
   keep the activated data sharing scheme or activate the another data sharing scheme based on the selection.

2. The mobile device of claim 1, wherein the mobile device is further caused to:

if the received selection indicates a selection of the another data sharing scheme, present one or more other applications, one or more other services, or a combination thereof in the at least one user interface of the mobile device to indicate that the one or more other applications, the one or more other services, or a combination thereof are at least substantially compliant with the another data sharing scheme and have become available to be enabled based on the another data sharing scheme, wherein the context data indicates a state of the mobile device, a state of the device environment, an inferred state of a user of the mobile device or a combination thereof, and wherein the one or more applications, the one or more services, or a combination thereof to be gained or lost include a check-in service to be gained.

3. The mobile device of claim 1, wherein the mobile device is further caused to:

recommend the another data sharing scheme to activate based on the new point of interest context, wherein the another data sharing scheme enables one or more other applications, one or more other services, or a combination thereof, and wherein the one or more sensors include a location sensor, a speed sensor, an audio sensor, a brightness sensor, or a combination thereof.

4. The mobile device of claim 3, wherein the mobile device is further caused to:

present the one or more other applications, the one or more other services, or the combination thereof in the user interface of the mobile device used to indicate that the one or more applications, the one or more services, or the combination thereof have been provisioned.

5. The mobile device of claim 1, wherein the mobile device is further caused to:

activate the another data sharing scheme at the mobile device for a duration of the new point of interest context, wherein the new point of interest is a bus stop, and the one or more applications, the one or more services, or a combination thereof to be gained or lost include a bus timetable application to be activated.

6. The mobile device of claim 1, wherein the data sharing scheme is activated at the mobile device via the user interface of the mobile device that also is used to indicate that the one or more applications, the one or more services, or the combination thereof have been provisioned, and wherein the new point of interest is a public space, and the one or more applications, the one or more services, or a combination thereof to be gained or lost include a local deal service, a group shopping service, or a combination thereof.

7. The mobile device of claim 1, wherein the mobile device is further caused to:

render the user interface for selecting the data sharing scheme on an initiation of the mobile device.

8. The mobile device of claim 1, wherein the data sharing scheme is further based, at least in part, on one or more privacy policies, one or more security policies, one or more cost policies, one or more device capabilities, or a combination thereof.

9. The mobile device of claim 1, wherein the mobile device is further caused to:

limit the mobile device to executing of the one or more applications, the one or more services, or the combination thereof that are provisioned at the mobile device based on the data sharing scheme.

10. The mobile device of claim 1, wherein the mobile device is further caused to:

present one or more notifications to indicate an availability of one or more additional applications, one or more additional services, or a combination thereof that are at least substantially compliant with the data sharing scheme.

11. A method for providing data sharing schemes, the method comprising:

determining, utilizing at least one processor, a data sharing scheme activated at a mobile device, wherein the mobile device includes one or more sensors, a context hub, and at least one user interface, wherein the one or more sensors of the mobile device are configured to gather sensor information relating to context data associated with the mobile device, wherein the data sharing scheme determines whether the context data can be transmitted from the mobile device to one or more devices over a network;

determining one or more applications, one or more services, or a combination thereof that will transmit the context data in a manner compliant with the determined data sharing scheme after provisioning;

provisioning, based on the activated data sharing scheme, the one or more applications, the one or more services, or a combination thereof for execution at the mobile device;

determining a new point of interest context of the mobile device utilizing at least the sensor information gathered by the one or more sensors of the mobile device, wherein the new point of interest context is that the mobile device is at or in proximity to a new point of interest;

determining, utilizing the context hub without user intervention, another data sharing scheme to potentially activate based on the new point of interest context;

determining, based on the another data sharing scheme, which one or more applications, one or more services, or a combination thereof are to be gained or lost based on the potential activation of the another data sharing scheme;

causing a presentation of the one or more applications, the one or more services, or a combination thereof to be gained or lost based on the potential activation;

rendering the at least one user interface configured to enable selecting, based on the new point of interest context, between the activated data sharing scheme and the another data sharing scheme;

receiving a selection indicating between the activated data sharing scheme and the another data sharing scheme; and keeping the activated data sharing scheme or activating the another data sharing scheme based on the selection.

12. The method of claim 11, further comprising:

if the received selection indicates a selection of the another data sharing scheme, presenting one or more other applications, one or more other services, or a combination thereof in the at least one user interface of the mobile device to indicate that the one or more other applications, the one or more other services, or a combination thereof are at least substantially compliant with the another data sharing scheme and have become available to be enabled based on the another data sharing scheme, wherein the context data indicates a state of the mobile device, a state of the device environment, an inferred state of a user of the mobile device or a combination thereof.

13. The method of claim 11, further comprising:
recommending the another data sharing scheme to activate based on the new point of interest context, wherein the another data sharing scheme enables one or more other applications, one or more other services, or a combination thereof, and wherein the one or more sensors include a location sensor, a speed sensor, an audio sensor, a brightness sensor, or a combination thereof.

14. The method of claim 13, further comprising:
presenting the one or more other applications, the one or more other services, or the combination thereof in the user interface of the mobile device used to indicate that the one or more applications, the one or more services, or the combination thereof have been provisioned.

15. The method of claim 11, further comprising:
activating the another data sharing scheme at the mobile device for a duration of the new point of interest context.

16. The method of claim 11, wherein the data sharing scheme is activated at the device via the user interface of the mobile device that also is used to indicate that the one or more applications, the one or more services, or the combination thereof have been provisioned.

17. A non-transitory computer-readable storage medium carrying one or more sequences of one or more instructions which, when executed by one or more processors, cause a mobile device to at least perform the following steps for providing data sharing schemes:
determining, utilizing at least one processor, a data sharing scheme activated at a mobile device, wherein the mobile device includes one or more sensors, a context hub, and at least one user interface, wherein the one or more sensors of the mobile device are configured to gather sensor information relating to context data associated with the mobile device, wherein the data sharing scheme determines whether the context data can be transmitted from the mobile device to one or more devices over a network;
determining one or more applications, one or more services, or a combination thereof that will transmit the context data in a manner compliant with the determined data sharing scheme;
provisioning, based on the activated data sharing scheme, the one or more applications, the one or more services, or a combination thereof for execution at the mobile device;
determining a new point of interest context of the mobile device utilizing at least the sensor information gathered by the one or more sensors of the mobile device, wherein the new point of interest context is that the mobile device is at or in proximity to a new point of interest;
determining, utilizing the context hub without user intervention, another data sharing scheme to potentially activate based on the new point of interest context;
determining, based on the another data sharing scheme, which one or more applications, one or more services, or a combination thereof are to be gained or lost based on the potential activation of the another data sharing scheme;
causing a presentation of the one or more applications, one or more services, or a combination thereof to be gained or lost based on the potential activation;
rendering the at least one user interface configured to enable selecting, based on the new point of interest context, between the activated data sharing scheme and the another data sharing scheme;
receiving a selection indicating between the activated data sharing scheme and the another data sharing scheme; and
keeping the activated data sharing scheme or activating the another data sharing scheme based on the selection.

18. The non-transitory computer-readable storage medium of claim 17, wherein the apparatus is caused to further perform:
if the received selection indicates a selection of the another data sharing scheme, presenting one or more other applications, one or more other services, or a combination thereof in the at least one user interface of the mobile device to indicate that the one or more other applications, the one or more other services, or a combination thereof are at least substantially compliant with the another data sharing scheme and have become available to be enabled based on the another data sharing scheme, wherein the context data indicates a state of the mobile device, a state of the device environment, an inferred state of a user of the mobile device or a combination thereof.

19. The computer-readable storage medium of claim 17, wherein the apparatus is caused to further perform:
recommending the another data sharing scheme to activate based on the new point of interest context, wherein the another data sharing scheme enables one or more other applications, one or more other services, or a combination thereof, and wherein the one or more sensors include a location sensor, a speed sensor, an audio sensor, a brightness sensor, or a combination thereof.

20. The computer-readable storage medium of claim 19, wherein the apparatus is caused to further perform:
presenting the one or more other applications, the one or more other services, or the combination thereof in the user interface of the mobile device used to indicate that the one or more applications, the one or more services, or the combination thereof have been provisioned.

* * * * *